(12) United States Patent
Chapman

(10) Patent No.: US 9,651,721 B2
(45) Date of Patent: May 16, 2017

(54) RETROREFLECTOR WITH LOW REFRACTIVE INDEX BACKING

(75) Inventor: Steven R. Chapman, Glenview, IL (US)

(73) Assignee: Avery Dennison Corporation, Glendale, CA (US)

( * ) Notice: Subject to any disclaimer, the term of this patent is extended or adjusted under 35 U.S.C. 154(b) by 799 days.

(21) Appl. No.: 13/595,065

(22) Filed: Aug. 27, 2012

(65) Prior Publication Data

US 2014/0055858 A1     Feb. 27, 2014

(51) Int. Cl.
*G02B 5/124* (2006.01)
*G02B 1/118* (2015.01)

(52) U.S. Cl.
CPC ............. *G02B 5/124* (2013.01); *G02B 1/118* (2013.01); *Y10T 156/1028* (2015.01)

(58) Field of Classification Search
None
See application file for complete search history.

(56) References Cited

U.S. PATENT DOCUMENTS

| | | |
|---|---|---|
| 5,854,709 A | 12/1998 | Couzin |
| 5,940,212 A | 8/1999 | Johnson et al. |
| 5,943,167 A | 8/1999 | Kelly |
| 6,120,879 A | 9/2000 | Szczech et al. |
| 6,819,507 B2 | 11/2004 | Minoura et al. |
| 7,445,347 B2 | 11/2008 | Couzin |
| 2006/0181493 A1 | 8/2006 | Satoh |
| 2008/0092418 A1 | 4/2008 | Peck et al. |
| 2008/0292808 A1 | 11/2008 | Liu et al. |
| 2009/0219618 A1 | 9/2009 | Chipman et al. |
| 2009/0303592 A1 | 12/2009 | Oakley |
| 2010/0040859 A1 | 2/2010 | Chang et al. |
| 2010/0053754 A1 | 3/2010 | Chapman et al. |

(Continued)

FOREIGN PATENT DOCUMENTS

| | | |
|---|---|---|
| JP | 6347622 | 12/1994 |
| WO | 2007092635 | 8/2007 |

OTHER PUBLICATIONS

International Search Report and Written Opinion issued in corresponding IA No. PCT/US2013/054833 dated Jun. 4, 2014.

(Continued)

*Primary Examiner* — Jennifer L. Doak
(74) *Attorney, Agent, or Firm* — Avery Dennison Corporation

(57) ABSTRACT

A retroreflective article and method is provided. The retroreflective article includes a first transparent layer having a back surface with retroreflective prisms, and a planar front surface that has an index of refraction n1. A second transparent layer having an index of refraction n2 is less than n1 overlies the back surface of the first layer. The second layer includes an array of uniform nanostructures of transparent material that define pores having a width that is less than one half of the wavelength of visible light. The nanostructures may be an array of parallel, same-sized nanorods that are obliquely oriented with respect to the first transparent layer, or a grid-like or parallel array of tapered nano-ridges of uniform size that define tapered pores or tapered grooves. The second layer preferably has a porosity greater than 60% so that the resulting index of refraction n1 is no larger than about 1.20.

31 Claims, 5 Drawing Sheets

(56) References Cited

U.S. PATENT DOCUMENTS

2010/0177380 A1* 7/2010 Nagahama et al. .......... 359/359
2010/0195201 A1  8/2010 Minoura et al.
2010/0265584 A1 10/2010 Coggio et al.
2012/0037025 A1  2/2012 Patel et al.
2012/0057235 A1* 3/2012 Chang et al. ................ 359/558

OTHER PUBLICATIONS

International Preliminary Report on Patentability issued in corresponding IA No. PCT/US2013/054833 dated Mar. 12, 2015.
Low-Refractive-Index Materials: A New Class of Optical Thin-Film Materials: by E.F. Schubert et al., Phys. Stat. Sol. (b) 244, 3002-3008 (2007) DOI 10.1002/psab.200675603.

* cited by examiner

RETROREFLECTOR WITH LOW REFRACTIVE INDEX BACKING

FIELD

This invention generally relates to retroreflectors, and is specifically concerned with retroreflectors lined with a backing layer formed from a porous material having a very low refractive index in order to achieve high-efficiency total internal reflection over a broad range of entrance angles.

BACKGROUND

Retroreflectors in the form of sheeting are often used in highway signs and safety garments for highway construction workers to increase nighttime visibility. Retroreflective plastic plates are used as pavement markers and vehicle reflectors. Such retroreflective sheeting and plates typically comprise a layer of transparent plastic material having a substantially smooth front surface, and a rear surface provided with a plurality of retroreflective cube corner elements.

The cube corners in such products often achieve retroreflectivity by means of total internal reflection (TIR). Incident light beams entering the front surface of the article are reflected internally in prism-like fashion between the three surfaces of the cube corners and back out of the cube corners in the direction from which they came. Ideally, such retroreflectors should be able to retroreflect light beams entering the front surface of the sheeting not only at low entrance angles that are near zero (i.e. in a direction near normal to the sheeting) but at high entrance angles as well. Since the ability to internally reflect light at high entrance angles is dependent on the difference between the indices of refraction of the material forming the cube corners and the material that interfaces with the back surface of the cube corners, many retroreflective sheets and plates provide an air space behind the cube corners in order to maximize this difference. However, even when such an air backing is used, light entering the cube corners beyond a certain critical angle will begin to leak out of the cube corners by passing through one or more of the three faces of the cube corners.

To solve this problem and to increase the ability of the sheet to retroreflect entrance light at an even larger entrance angle, it is common to apply a reflective metallic layer such as vacuum-deposited aluminum to the rear surface of the cube corner elements. In such a structure, when light enters the cube corners, it is specularly reflected off of the metallic layers when it reaches the faces of the cube corners, and retroreflected back toward its source, even when entering at angles beyond the critical angle for TIR in an air-backed structure.

In addition to increasing the entrance angle for retroreflectivity, metallization provides a seal over the back surface of the cube corners that prevents TIR-destroying dirt and moisture from lodging on the back surfaces of the cube corners which would in turn degrade or destroy the ability of the cube corners to provide TIR. Metallization also allows the back surface to be fully supported (such as by the well-known "potting" technique) to give additional strength to the overall reflector construction.

Unfortunately, metallization has the disadvantage of reducing the overall retroreflectance of the article. Unlike TIR, for which reflectance is 100%, aluminum has a reflectance of only about 85%. Consequently, intensity of a retroreflected ray of light that is reflected off of three aluminized faces is reduced to about $(85\%)^3$ or about 61% of its corresponding TIR intensity.

Moreover, the provision of air spaces behind the cube corners to maximize the entrance angle for TIR can compromise the integrity of the resulting structure, rendering it mechanically weaker and thermally less stable than a solid construction. For some applications, such air spaces can be created by making the transparent material relatively thick and self-supporting, such as in vehicle taillight reflectors. However such structures require (relative to sheeting) large amounts of plastic material and hence are relatively expensive on a per-area basis. In applications where the transparent material must be thinner than tail light reflectors and yet stronger than sheeting, such as pavement marker reflectors, these air spaces can be created by ribs extending rearward of the cube corner elements to define "cells", each cell containing one or more cube corner elements. While such ribs give strength to the retroreflector construction, and help to confine dirt or moisture-admitting damage to only those cube corner elements in the damaged cells, the area taken up by the ribs or cell walls is typically not retroreflective, and so decreases the overall retroflectivity of the article.

To overcome these shortcomings, retroreflective sheeting has been developed that employs, in lieu of air spaces, a solid backing layer having an index of refraction that is lower than the index of refraction of the transparent material used to form the cube corners. While such sheeting is structurally sounder and stronger than comparable sheeting employing air spaces behind the cube corners, the ability of such sheeting to provide TIR for a broad range of entrance angles is significantly less than that of air-backed articles because the difference in the index of refraction between the material forming the cube corners and the material forming the solid backing layer is less. For example, if the cube corners are formed from polycarbonate having an index of refraction n=1.59, and the solid backing material is cryolite having an index of refraction of n=1.32, the difference between the indices of refraction is 1.59−1.32=0.27. By contrast, when the backing layer is formed from air having an index of refraction n=1.00, the difference between the indices of refraction is 1.59−1.00=0.59 which is more than twice as much as 0.27. While this problem might be partially solved by the application of a reflective metallic layer over the back surface of the solid backing layer, such a retroreflector would rely even more upon the specular reflection provided by the reflective layer since the critical angle for TIR is smaller, which, as pointed out earlier, reduces the intensity of the retroreflected light by about 39%.

To increase the critical angle for TIR, materials having an index of refraction lower than cryolite have been used in such retroreflectors. For example, a thin optical film formed from particulate metal oxide such as silicon dioxide or alumina mixed with a binder has been applied as a backing layer to retroreflected sheeting. The resulting layer is characterized by nanoporosity and can have an index of refraction n as low as 1.10.

SUMMARY

While the use nanoporous films formed from a mixture of a particulate metal oxide and a binder is capable of producing a retroreflective sheeting or plates having a solid backing layer with a larger critical angle for TIR, the applicant has observed that such retroreflective articles are difficult and expensive to manufacture due to the fact that such films must have a uniform porosity at scales on the order of a micron. It is thus an object of the invention to provide a retroreflector with a solid backing layer that exceeds all of the optical and structural advantages associated nanoporous films, but which is easier and less expensive to manufacture.

To this end, the retroreflective article of the invention comprises a first transparent layer having a back surface that includes a plurality of retroreflective prisms, and a planar front surface that receives incident light, and an index of refraction n1, and a second transparent layer overlying the back surface of the first transparent layer having an index of refraction n2 that is significantly less than the index of refraction n1 and which includes an array of uniform nanostructures of transparent material that define pores having a width that is less than one half of the wavelength of visible light. The nanostructures may comprise an array of parallel, same-sized nanorods that are obliquely oriented at a same angle with respect to the first transparent layer and which have a porosity of 60% or greater so that the resulting index of refraction n1 is no larger than about 1.20. Alternatively, the nanostructures may comprise a uniform array of tapered ridges of uniform size and spacing incorporated into the first transparent layer that define pores having a width that is less than one half of the wavelength of visible light. The ridges may be arranged in parallel or in a grid-like pattern.

To increase the angle of incidence wherein TIR may be achieved, a reflective layer may be provided over the second transparent layer. The reflective layer may be formed from a specular reflective metallic layer such as aluminum or silver, or a diffuse reflective layer formed from a white material such as titanium dioxide. In all cases, the material forming the reflective layer is applied so that it bridges the projecting ends of the nanostructures of the second layer so that the pores defined between the nanorods are substantially devoid of material forming the reflective layer.

The retroreflective article of the invention may also include one or more structural features to increase the daytime brightness of the sheeting. For example, the retroreflective prisms may be cube corners having truncated tips that have been textured to increase their daytime reflectivity. The surfaces of the retroreflective prisms may include a light diffusive pattern or the front surface of the first transparent layer may be printed on selected areas to increase the daytime brightness of the sheeting. Finally, at least some of the retroreflective prisms may have one or both of canted optical axes and laterally displaced apices that result in some of the light being transmitted through walls of the prisms rather than being retroreflected in order to increase the daytime brightness of the sheeting.

The invention further encompasses method for forming a retroreflective article, comprising the steps of providing a first transparent layer having a back surface that includes a plurality of retroreflective prisms, and a planar front surface that receives incident light, and an index of refraction n1, and providing a second transparent layer over the back surface of the first transparent layer having an index of refraction n2 that is significantly less than the index of refraction n1 and which includes an array of nanostructures of transparent material that define pores having a width that is less than one half of the wavelength of visible light In one embodiment of the method, the nanostructures are an array of parallel, obliquely-oriented nanorods deposited over the surfaces of the retroreflective prisms by oblique angle e-beam evaporation. This embodiment of the method exploits the fact that certain evaporated materials, such as silicon dioxide, will inherently self-organize into parallel nanorods defining pores having a width that is less than one half of the wavelength of visible light when they condense on a cold surface. This embodiment further exploits the fact that because the faces of retroreflective prisms are already oriented at about a 45° angle to the substrate, the substrate only needs to be tilted between about 40° and 44° to a vertically oriented stream of evaporated silicon dioxide to form obliquely-oriented nanorods having a porosity of 80% or higher.

In an alternative embodiment of the method, the second transparent layer may be embossed over the surface of the first transparent layer by the tooling used to form the prisms. The surface of the tooling may include nanostructures that are half or less than the wavelength of visible light (such as tapered nano-grooves in a parallel or grid-like pattern) etched into the surface of the tooling by 3-D grey-scale e-beam or x-ray lithography. Such tooling is capable of embossing an array of tapered nano-ridges in a parallel, grid-like or even "moth-eye" pattern over the back surface of the first transparent layer having an index of refraction n2 on the order of 1.20 or less that is significantly less than the index of refraction n1 of the first transparent layer.

DETAILED DESCRIPTION OF THE EMBODIMENTS

Figure 1:
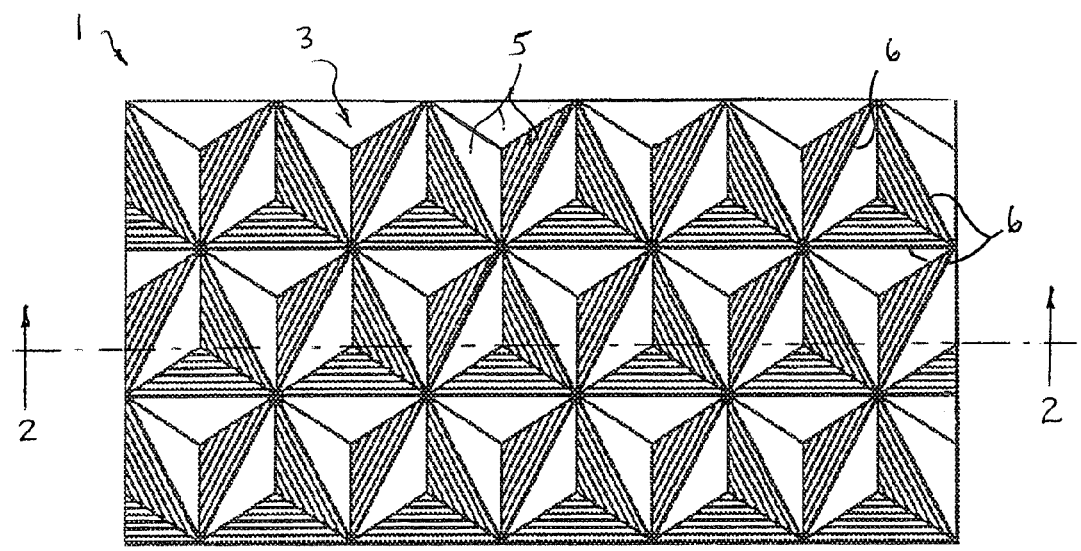
FIG. 1 is a plan view of a cube corner retroreflective sheeting.
Figure 2:
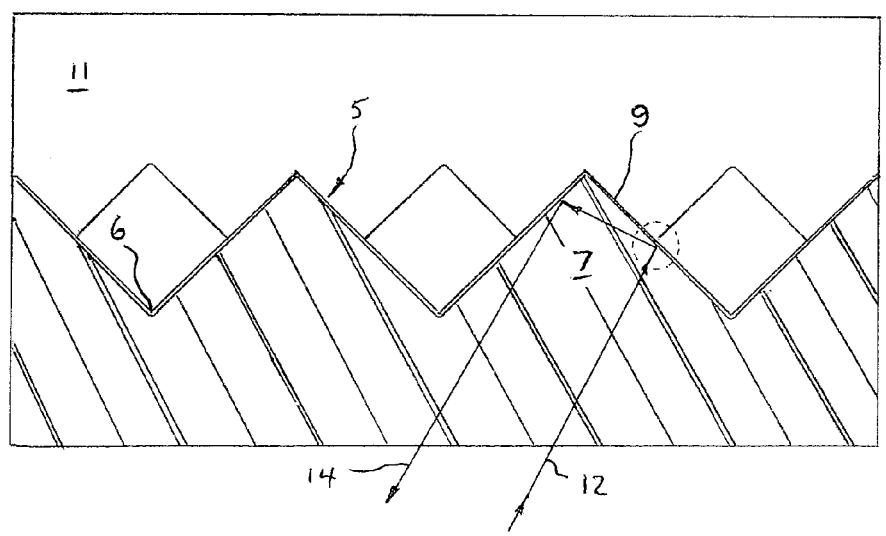
FIG. 2 is a cross-sectional view of the sheeting of FIG. 1 along the line 2-2, illustrating the first and second transparent layers of the sheeting.

With reference to FIGS. 1 and 2, the retroreflective sheeting 1 of the invention in this example includes an array of retroreflective cube corners 3 defined by three intersecting sets of Vee-grooves 6 as shown. Each cube corner 3 includes three faces 5. As is shown in FIG. 2, the faces 5 of each cube corner 3 are formed from first layer 7 of transparent material which is covered by a second, thinner layer 9 of transparent material. The first layer 7 is preferably formed from a plastic material such as acrylic or polycarbonate or polyester having an index of refraction n1 of between about 1.45 and about 1.65. For certain applications, the first layer 7 may also be formed from glass having an index of refraction n1 between 1.50 and 1.70. The second layer 9 overlies the back surface of the first layer 7 and is formed from a transparent material having an index of refraction n2 that is significantly less than the index of refraction n1 of the first layer 7. As described in more detail hereinafter, the second layer 9 achieves such a significantly lower index of refraction n2 a by the incorporation of a regular pattern of nanostructures of transparent material that define pores having a width that is less than one half of the wavelength of visible light. The porosity of the second layer 9 is preferably 60% or higher and more preferably 80% or higher so that the index of refraction n2 of the second layer 9 is preferably 1.20 or less and more preferably 1.10 or less. The second layer 9 is preferably covered by a layer 11 of supporting material. Layer 11 functions to seal the faces 5 of the cube corners from dirt and moisture that could otherwise compromise the retroreflective ability of the sheet material 11, and to impart strength and rigidity to the sheet material 1. The material forming the supporting layer may be the same plastic material forming the first layer 7.

In operation, the inner surfaces of the faces 5 of the cube corners reflect incoming light beams 12 in prism-like fashion due to the difference between the index of refraction n1 of the first layer 5 (i.e. between about 1.45 and 1.65) and the index of refraction n2 of the second layer 7 (which is preferably between 1.05 and 1.10). The incoming light beams 12 are reflected at right angles due to the 90° mutual orientation of the faces 5 such that the outgoing reflected light beams 14 are parallel to the incoming light beams 12.

Figure 3A:
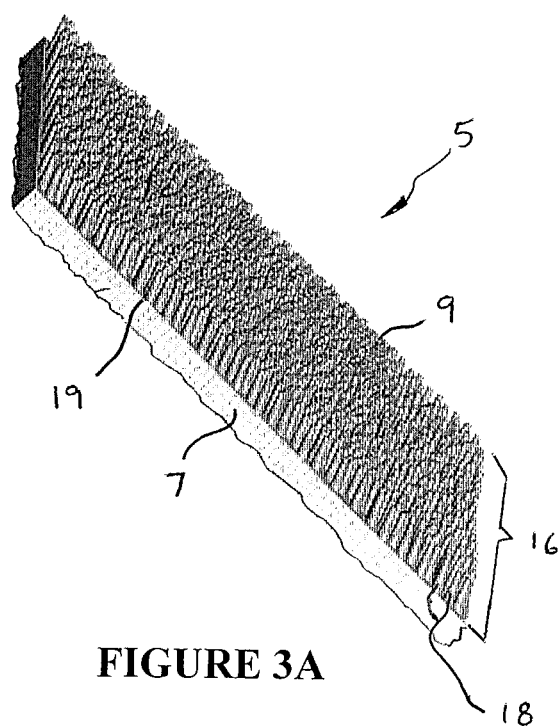
FIG. 3A is an enlarged perspective view of the area circled in phantom in FIG. 2, illustrating the first embodiment of the inventive sheeting wherein the second transparent layer is formed from an array of obliquely-oriented, same-sized nanorods.
Figure 3B:
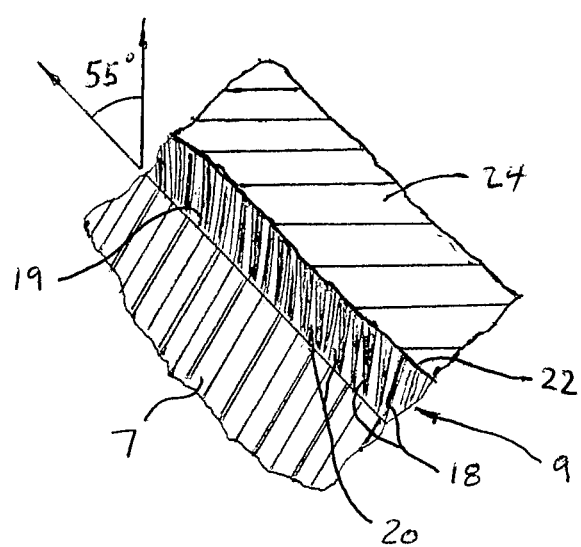
FIG. 3B is an enlarged cross-sectional view of the area circled in phantom in FIG. 2, which further illustrates the application of an optional reflective layer over the second transparent layer.

With reference now to FIGS. 3A and 3B, the second transparent layer 9 may be formed from an array 16 of nanorods 18 that are of approximately the same length and oblique orientation with respect to the outer surface 19 of the second transparent layer 9. FIG. 3A is a perspective view illustrating the array 16 of nanorods 18 without any overlying layers so that the structure of the array 16 may be more easily seen. FIG. 3B is a cross sectional view of the array 16 of nanorods 18 illustrating other layers that may overlie it.

In this example of the invention, the nanorods 18 are formed from silicon dioxide ($SiO_2$) that has been deposited over the surface 19 via electron beam oblique-angle deposition techniques detailed in such prior art publications as "Low-Refractive-Index Materials: A New Class of Optical Thin-Film Materials" by E. F. Schubert et al, Phys. Stat. Sol. (b) 244, 3002-3008 (2007) DOI 10.1002/psab. 200675603, the entire content of which is hereby expressly incorporated into this application by reference. Such deposition techniques are capable of depositing an array 16 of nanorods 18 that are oriented at about a 45° angle to the surface 18 of the first transparent layer 7. The nanorods 18 form a thin second layer 9 of transparent material that can be about 500 nm thick. The nanorods 18 define pores 20 that are less than one-half of the wavelengths of visible light, and the overall porosity of such layer of oblique nanorods is about 88.9%. Such a high porosity provides the transparent second layer 9 of this example of the invention with an index of refraction n2 of 1.05. As shown in FIG. 3B, a thin "sealing" layer 22 of silicon dioxide is preferably provided over the tops of the nanorods 18 after the nanorods 18 are formed by orienting the support surface 19 orthogonally with respect to the vapor flux used to form the nanorods 18. Such a sealing layer 22 advantageously prevents material from an overlying layer (whether it be the layer 11 of supporting material or an optional reflective layer 24) from "bridging" the pores 20 defined between the nanorods 18 which in turn would reduce the porosity and increase the index of refraction of the second transparent layer 9.

In the example of the sheeting shown in FIG. 3B, an optional layer 24 of reflective material is applied over the sealing layer 22. The provision of such a layer 24 of reflective material advantageously increases the angle of incidence that the cube corners 3 can retroreflect. Layer 24 may be formed from a specularly reflective material such as vacuum deposited aluminum or silver. When layer 24 is formed from a reflective metal layer, it may be desirable to boost the daytime brightness (cap-Y) of the sheeting 1. This can be done on the metal tooling that embosses the cube corners 3 on the sheeting 1 by means of laser engraving a diffuse reflective pattern on a portion of the article as disclosed in US2010053754A, or by truncating the cube corners and providing the flattened cube tips with a scattering surface texture. Alternatively, a pre-printed diffuse film could be used for the first transparent layer 7, or for an overlay in front of the first transparent layer 7. In place of, or in addition to, these cap-Y boosting techniques, the daytime brightness of the sheeting 1 could be increased by employing the techniques disclosed in U.S. Pat. No. 7,445,347 assigned to the Avery Dennison Corporation. Such additional techniques include canting the cube corners 5 to reflect near normal incoming light to an angle of approximately 45°. Additionally, laterally displacing the apices of such canted cube corners 5 from a centered position can affect the amount of light directed to approximately 45°.

If the difference between the indices of refraction n1 and n2 is large enough that entrance angularity is not a concern, the layer 24 may be formed from a diffuse reflective coating such as white ink or paint. Layer 24 would then serve as a protective layer and would also to boost the daytime brightness of the retroreflective sheeting 1. For some applications, layer 24 may include a patterned deposition of specularly-reflecting metal backed up with a deposit of a diffuse (e.g. white) reflective layer. This could provide for chameleonic behavior and also provide some boost in cap-Y daytime brightness of the sheeting 1. Another way to boost cap-Y would be to cant only some of the cube corners 3 in the sheeting 1 so that they "leak" at near-zero entrance angles. Although this technique sacrifices retroreflective efficiency at near normal incidence, it boosts the daytime brightness and simultaneously improves retroreflective efficiency at larger entrance angles.

While not shown in the several Figures, different cube corner types may be used to implement the sheeting of the invention. For example, four-sided rectangular cube corners could be used in lieu of or in combination with the illustrated three-sided cube corners 3 in order to increase retroreflective efficiency. Such rectangular cube corners can be fabricated by cutting one or two rows of cubes on the edge of a micro-thick plate or blade. This process allows two or more different cube designs to be mixed together. For an example utilizing "single" blades (i.e. blades with a single row of cubes on the edge), two "single" blades with one particular cube design could be placed "back-to-back" with the bevel sides facing outward, and then placed adjacent to a "back-to-back" pair of blades with a different cube design, and so forth. This allows the different cube types to be mixed without creating vertical walls at the adjacencies. Similarly, "double" blades (i.e. blades with two rows of cubes on the edge) could be manufactured with each row having a different cube design (especially different cant and centration). These blades can be stacked "back-to-back" to create a mixed array. One cube type could be designed to have high efficiency at lower entrance angles. A second cube type could be designed to provide improve daytime brightness by canting to allow "leakage" at near-zero entrance angles and/or de-centering the apex. The second type of cube corner could also boost the retroreflectivity at larger entrance angles.

It may be desirable to have unequal ratios of two or more different cube types. For example, current rectangular cube sheeting may have its retroreflective efficiency lowered by 25% due to the patterned sealing of a backing film to provide air cells. Better retroreflective efficiency could be obtained by eliminating the sealing, using a low index backing and a white coating behind that. However, the daytime brightness would probably degrade. So, replace one in four of the cubes with a cube which "leaks" at near-zero entrance angles. This would improve the daytime brightness, maintain the original retroreflective efficiency, and possibly boost retroreflectivity at larger entrance angles. Replacing one in four cubes could be accomplished by utilizing six normal "single" blades with 2 "leaky" blades. Or "double" blades could be used: 2 "normal/leaky" combo blades, "leaky" sides back-to-back, and then 2 "normal/normal" blades.

From the foregoing. it is clear that an optimal balance between large entrance angle reflectivity, daytime brightness, and head-on retroreflectivity can be accomplished by including or omitting the reflective layer 24, selecting specular or diffuse reflective material for the layer 24 if it is included, selecting a roughened texture for a portion of the article, canting and/or laterally displacing the axes of some or all of the cube corners 3, and using different types of cube corners either exclusively or in combination.

If the second transparent layer 9 provides sufficient protection to the faces 5 of the cube corners 3 from moisture, oil, dirt, etc. then it may be possible to omit both the support layer 11 and the reflective layer 24. The sheeting 1 could be used as is, or an adhesive could be deposited directly onto the second transparent layer 9. The adhesive may be pigmented (e.g. white) to improve the daytime brightness.

Figure 4:
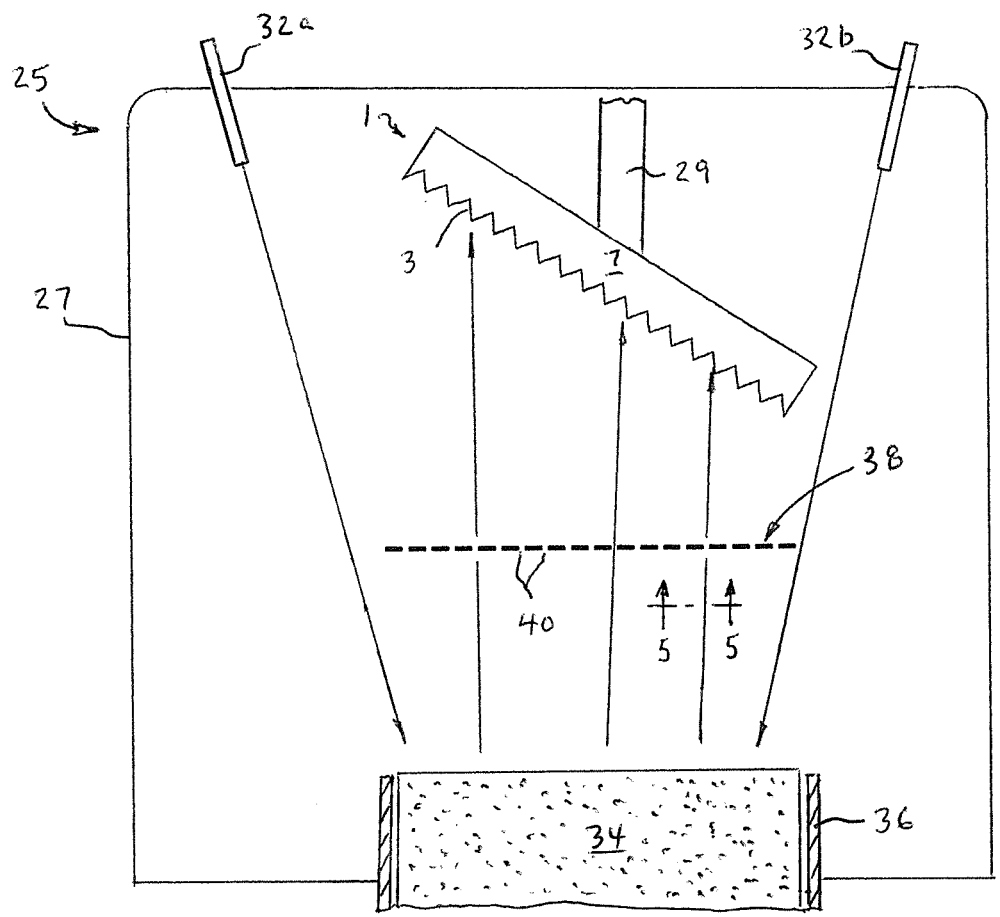
FIG. 4 is a schematic view of the first embodiment of the method of the invention wherein oblique-angle e-beam evaporation is used to create the layer of nanorods illustrated in FIGS. 2A and 2B.
Figure 5:
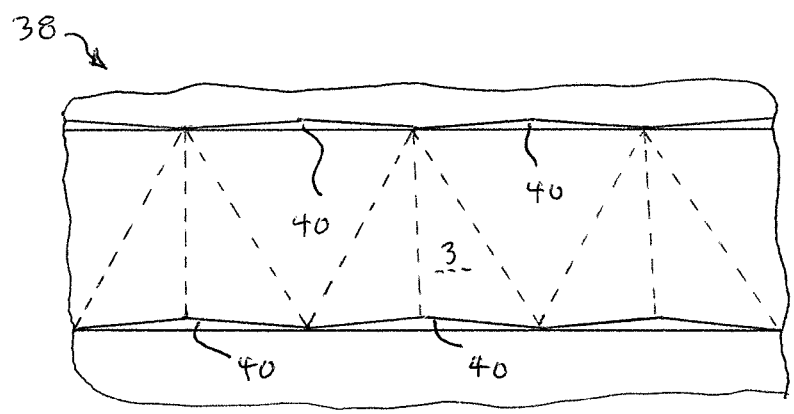
FIG. 5 is a plan view of the mask used in the fabricating method of FIG. 4 along the line 5-5 in FIG. 4.

FIGS. 4 and 5 illustrate a method of forming the second transparent layer 9 out of an array 16 of nanorods 18 by way of an e-beam evaporation device 25 that is similar to one described in US Application Publication 2010/0040859 the entire specification of which is hereby expressly incorporated herein by reference. Device 25 includes a partially evacuated chamber 27 into which a controlled flow of process gases are introduced. A substrate of the sheeting 1 formed from the first transparent layer 7 is held inside the evacuation chamber 27 by a manipulation device 29. A plurality of electron beam sources 32a, 32b are mounted in the chamber 27 in opposition to one or more ingots 34 of silicon dioxide. The silicon dioxide ingot is held within a water cooled, copper crucible 36 and is arranged to be vertically pushed-up through the camber 27 as the upper surface is evaporated away from the electron beams emanated from the electron beam sources 32a, 32b. A mask 38 is positioned between the silicon dioxide ingot 34 and the sheeting first layer 7. The mask includes a plurality of slots 40 (best seen in FIG. 5) that admit a vapor flux 44 to only one of the three faces 5 of the cube corners 3. In operation, the first layer 7 is tilted at an angle of between about 40° and 44° along one set of the vee grooves 6 that define the cube corners 3 so that one of the three sets of cube corner faces 5 is tilted between about 85°-88° with respect to a horizontal axis. The mask 38 is carefully positioned so that the slots 40 (which are shaped like foreshortened triangles) are aligned with respect to a vertical axis with the cube corner faces 5 that are tilted between about 85°-88° as indicated in phantom in FIG. 5. The end result is that the flux of evaporated silicon dioxide only impinges on one set of the faces 5 of the cube corners 3 at the highly oblique angle necessary to form an array of nanorods 18 at a 45° angle and high porosity on the order of 88%. Once the nanorods 18 are deposited on the first set of cube corner faces 5, the manipulator 29 is used to rotate the sheeting 1 120° (in his example where the cube corner perimeters are equilateral triangles) and to re-tilt the sheeting into the position shown in FIG. 5. The aforementioned method steps are then repeated for the second and third faces 5 of the cube corners 3 to complete the formation of the second transparent layer 9.

Figure 6:
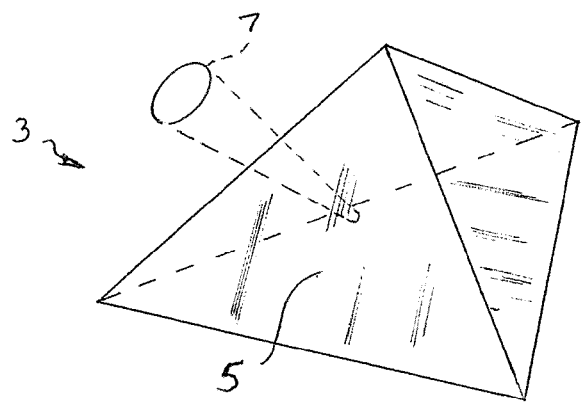
FIG. 6 is a perspective view of a cube corner of the inventive sheeting wherein the second transparent layer is formed from an array of tapered nano-ridges in a grid-like pattern.
Figure 7:
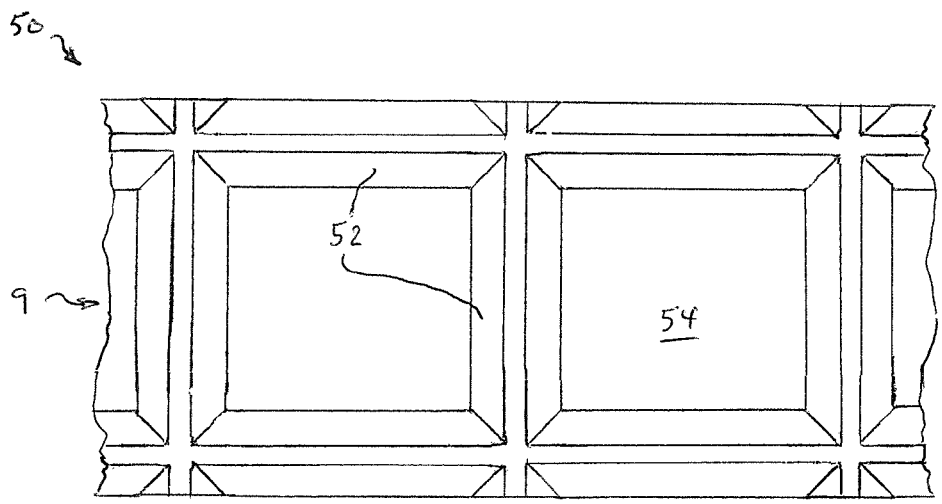
FIG. 7 is a plan view of the grid-like pattern of tapered nano-ridges forming the second transparent layer of the cube corners of the second embodiment.

FIG. 7 illustrates a greatly enlarged section of one of the cube corner faces 5 shown in FIG. 6 of a second embodiment of the sheeting 1 of the invention. In this embodiment, the second transparent layer 9 of each cube corner face 5 includes a grid-like array 50 of orthogonal, tapered nano-ridges 52 of uniform size that define tapered pores 54. The height of each nano-ridge 52 is less than half of the wavelength of visible light so that the light "sees" only an average index of refraction between the volume of air occupying the pore 54 and the volume of the nano-ridges 52. If the total volume of the nano-ridges 52 was proportioned to be about six times less than the volume of the pores 54, and if the index of refraction n1 of the plastic forming the first transparent layer 7 were 1.60, then the index of refraction n2 of the second transparent layer 9 would be 1.10. While a grid-like array 50 of orthogonal, tapered nano-ridges 52 forms the second transparent layer 9 of the cube corner faces 5 in this example, other configurations of nanostructures could also be used to achieve the same high porosity and low index of refraction.

Figure 8:
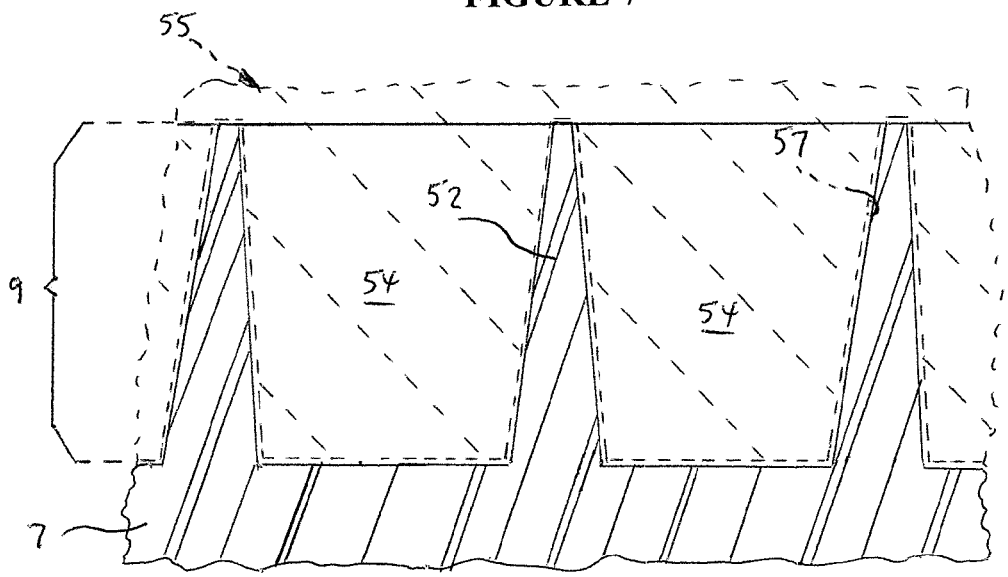
FIG. 8 is a cross-sectional view of the grid-like pattern of nano-ridges of FIG. 7, further illustrating in phantom the tooling used to emboss the tapered nano-ridges over the first transparent layer of the sheeting.

FIG. 8 illustrates a second method of forming the second transparent layer 9 with the array of nanostructures illustrated in FIG. 7. In this method, the surfaces of the metal tooling 55 used to form the faces 5 of the cube corners 3 are etched with a grid-like array of tapered grooves 57 that are complementary in shape to the grid-like array 50 of orthogonal, tapered nano-ridges 52. Such etching could be accomplished by the same or similar processes used to manufacture microelectronic devices, e.g. 3-D grey-scale e-beam or x-ray lithography. The resulting tooling 55 could then be used to form the second embodiment of the sheeting 1 of the invention quickly and economically by embossing the grid-like array 50 of orthogonal, tapered nano-ridges 52 directly onto the outer surface of the plastic material forming the first transparent layer 7. The tapered shape of the grooves 57 forming the nano-ridges 52 allows the tooling 55 to be withdrawn from the resulting sheeting without the retention of plastic material in the grooves 57.

Figure 9:
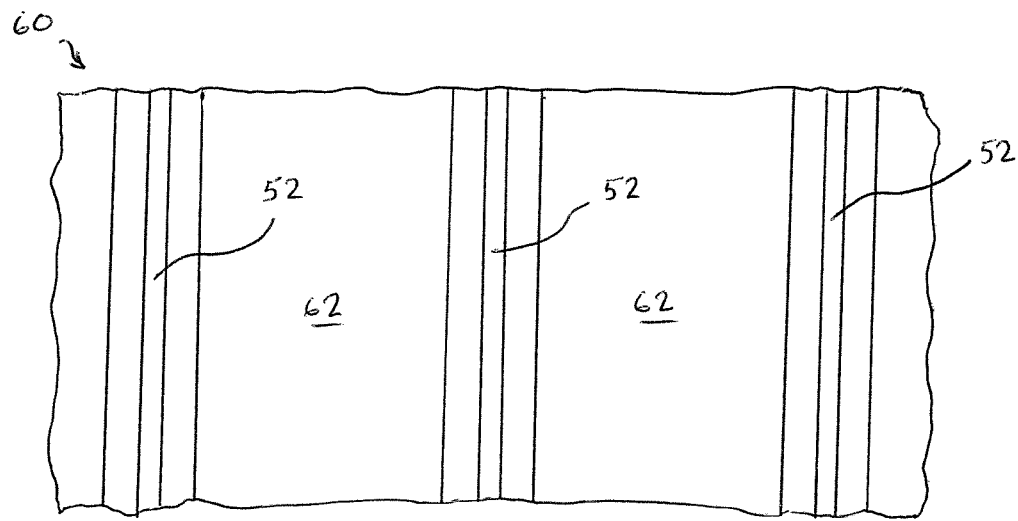
FIG. 9 is a plan view of a parallel pattern of tapered nano-ridges that may also form the second transparent layer of the cube corners in a third embodiment.

FIG. 9 illustrates a greatly enlarged section of one of the cube corner faces 5 shown in FIG. 6 of a third embodiment of the sheeting 1 of the invention wherein the second transparent layer 9 of each cube corner face 5 includes a parallel array 60 of orthogonal, tapered nano-ridges 52 of uniform size that define tapered grooves 62. Again, the height of each nano-ridge 52 is less than half of the wavelength of visible light so that the light "sees" only an average index of refraction between the volume of air occupying the grooves 62 and the volume of the nano-ridges 52. If the total volume of the nano-ridges 52 was proportioned to be about six times less than the volume of the grooves 62, and if the index of refraction n1 of the plastic forming the first transparent layer 7 were 1.60, then the index of refraction n2 of the second transparent layer 9 would be 1.10.

Figure 10:
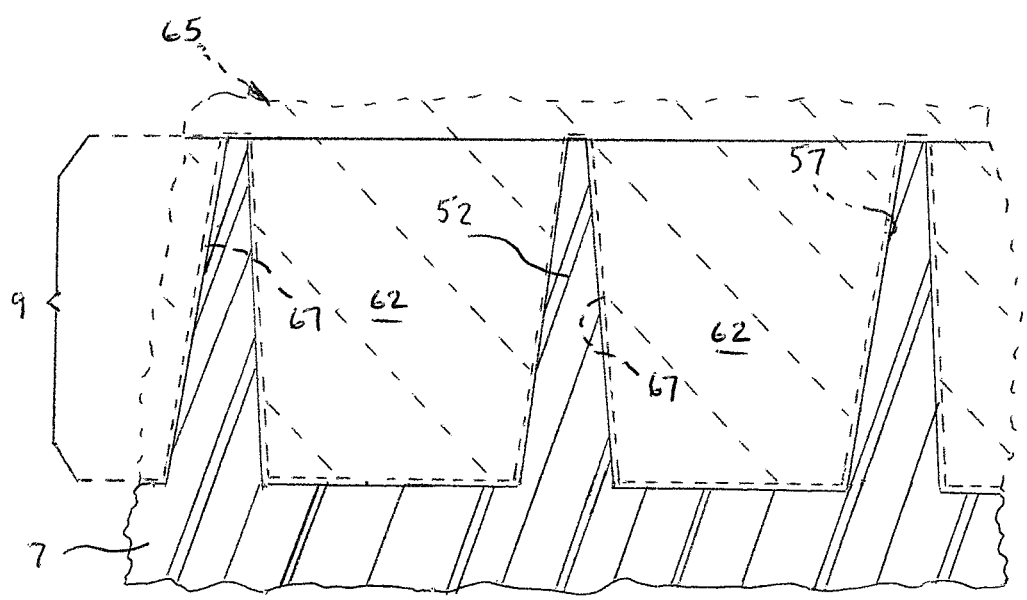
FIG. 10 is a cross-sectional view of the parallel pattern of nano-ridges of FIG. 8, further illustrating in phantom the tooling used to emboss the parallel pattern of nano-ridges over the first transparent layer of the sheeting.

FIG. 10 illustrates a variation of the second method of forming the second transparent layer 9 with the array of nanostructures illustrated in FIG. 9. In this method, the surfaces of the metal tooling 65 used to form the faces 5 of the cube corners 3 are etched with a parallel array of tapered grooves 67 that are complementary in shape to the parallel array 60 of orthogonal, tapered nano-ridges 52. Again, such etching could be accomplished by the same or similar processes used to manufacture microelectronic devices, e.g. 3-D grey-scale e-beam or x-ray lithography. The resulting tooling 65 could then be used to form the third embodiment of the sheeting 1 of the invention quickly and economically by embossing the parallel array 60 of orthogonal, tapered nano-ridges 52 directly onto the outer surface of the plastic material forming the first transparent layer 7. The tapered shape and parallel orientation of the grooves 67 forming the nano-ridges 52 allows the tooling 65 to be withdrawn from the resulting sheeting without the retention of plastic material in the grooves 67.

While the invention has been described in detail with particular reference to certain preferred embodiments thereof, it will be understood that variations and modifications can be effected within the spirit and scope of the invention, which is limited only by the appended claims and equivalents thereof.

The invention claimed is:

1. Retroreflective article, comprising:
   a first transparent layer having a back surface that includes a plurality of retroreflective cube corners, and a planar front surface that receives incident light, and an index of refraction n1,
   a second transparent layer overlying the back surface of the first transparent layer having an index of refraction n2 that is significantly less than the index of refraction n1 and which includes a regular pattern of uniformly sized nanostructures of transparent material that define pores having a width that is less than one half of the wavelength of visible light.

2. The retroreflective article defined in claim 1, wherein the nanostructures include mutually parallel nanorods that are substantially parallel to one another and have one end connected to the back surface of the first transparent layer and an opposite end projecting away from the back surface of the first transparent layer, the nanorods having substantially the same length.

3. The retroreflective article defined in claim 1, wherein the nanostructures include a grid-like array of tapered nano-ridges of uniform size that define tapered pores.

4. The retroreflective article defined in claim 1, wherein the porosity of the second transparent layer is at least about 60%.

5. The retroreflective article defined in claim 1, wherein the porosity of the second transparent layer is at least about 80%.

6. The retroreflective article defined in claim 1, wherein n2 is no larger than about 1.20 and n1 is at least about 1.40.

7. The retroreflective article defined in claim 2, wherein the axes of rotation of the nanorods are non-orthogonal to the surfaces of the retroreflective cube corners which they overlie.

8. The retroreflective article defined in claim 2, wherein the nanorods are formed from silicon dioxide and are deposited over the surfaces of the retroreflective cube corners by e-beam evaporation.

9. The retroreflective article defined in claim 1, wherein the nanostructures are integrally formed from the same material as the first transparent layer.

10. The retroreflective article defined in claim 2, further comprising a reflective layer overlying the second transparent layer and bridging the projecting ends of the nanorods of the second layer such that the pores defined between the nanorods are substantially devoid of material forming the reflective layer.

11. The retroreflective article defined in claim 10, wherein the reflective layer is a specular reflective metallic layer.

12. The retroreflective article defined in claim 10, wherein the reflective layer is a diffuse reflective layer formed from a white material.

13. The retroreflective article defined in claim 10, wherein the reflective layer is a combination of a specular reflective metallic layer and a diffuse reflective layer formed from a white material.

14. The retroreflective article defined in claim 10, wherein the retroreflective cube corners have truncated tips that have been textured that increases the daytime brightness of the sheeting.

15. The retroreflective article defined in claim 10, wherein portions of the article include a light diffusive pattern that increases the daytime brightness of the sheeting.

16. The retroreflective article defined in claim 10, wherein the front surface of the first transparent layer is printed on selected areas that increase the daytime brightness of the printed areas of the front surface.

17. The retroreflective article defined in claim 10, further comprising a printed layer overlying the front surface of the first transparent layer transparent layer that increases the daytime brightness of the printed areas of the printed layer.

18. The retroreflective article defined in claim 2, further comprising an adhesive layer overlying the second transparent layer and bridging the projecting ends of the nanorods of the second layer such that the pores defined between the nanorods are substantially devoid of material forming the adhesive layer.

19. The retroreflective article defined in claim 18, wherein the adhesive material is white.

20. The retroreflective article defined in claim 10, wherein at least some of the retroreflective cube corners are cube corners having one or both of canted optical axes and laterally displaced apices that retroreflect near normal incident light to an angle of about 45° with respect to the planar front surface in order to increase the daytime brightness of the sheeting.

21. The retroreflective article defined in claim 10, wherein at least some of the retroreflective cube corners are cube corners having one or both of canted optical axes and laterally displaced apices that result in some of the light being transmitted through walls of the cube corner rather than being retroreflected in order to increase the daytime brightness of the sheeting.

22. The retroreflective article defined in claim 10, wherein the retroreflective cube corners are rectangular prisms including corners having one or both of canted optical axes and laterally displaced apices such that, for some of the corners, some of the light is not retroreflected but rather is transmitted through walls of the rectangular corners in order to increase the daytime brightness of the sheeting.

23. A method for forming a retroreflective article, comprising:
   providing a first transparent layer having a back surface that includes a plurality of retroreflective cube corners, and a planar front surface that receives incident light, and an index of refraction n1, and
   providing a second transparent layer over the back surface of the first transparent layer having an index of refraction n2 that is significantly less than the index of refraction n1 and which includes a regular array of uniformly-sized nanostructures of transparent material that define pores having a width that is less than one half of the wavelength of visible light.

24. The method of claim 23, wherein the nanostructures of the second transparent layer are nanorods deposited over the surfaces of the retroreflective cube corners by e-beam evaporation.

25. The method of claim 23, wherein the nanostructures of the second transparent layer include a grid-like array of tapered nano-ridges of uniform size that define tapered pores.

26. The method of claim 24, wherein one end of each of the nanorods is connected to the back surface of the first transparent layer and an opposite end of each of the nanorods projects away from the back surface of the first transparent layer, and the nanorods are substantially the same length.

27. The method of claim 23, wherein the pore width is between about 2 and 8 nanometers.

28. The method of claim 24, wherein the thickness of the e-beam deposited second transparent layer is between about 150-2000 nanometers.

29. The method of claim 24, wherein the second transparent layer is formed from silicon dioxide.

30. The method of claim 25, wherein the second transparent layer is embossed over the surface of the first transparent layer.

31. The method of claim 24, further comprising applying a reflective layer over the second transparent layer that bridges the projecting ends of the nanorods of the second layer such that the pores defined between the nanorods are substantially devoid of material forming the reflective layer.

* * * * *